United States Patent [19]
Franklin, Sr.

[11] 3,912,375
[45] Oct. 14, 1975

[54] VEHICLE FAN HUB

[76] Inventor: Albert J. Franklin, Sr., P.O. Box 195, Seeley, Calif. 92273

[22] Filed: May 10, 1974

[21] Appl. No.: 468,959

[52] U.S. Cl. .................. 416/244; 416/204
[51] Int. Cl.² .................................. F04D 29/32
[58] Field of Search ............. 416/244, 244 A, 204

[56] References Cited
UNITED STATES PATENTS

| | | | |
|---|---|---|---|
| 1,898,628 | 2/1933 | Hollerith | 416/204 |
| 2,497,242 | 2/1950 | Sprouse | 416/204 X |
| 3,520,663 | 7/1970 | Schertel | 416/244 |

FOREIGN PATENTS OR APPLICATIONS

| | | | |
|---|---|---|---|
| 645,920 | 6/1937 | Germany | 416/244 |
| 734,891 | 4/1943 | Germany | 416/244 |
| 203,814 | 9/1923 | United Kingdom | 416/244 |

Primary Examiner—Everette A. Powell, Jr.
Attorney, Agent, or Firm—Robert K. Rhea

[57] ABSTRACT

The fan hub includes a cylindrical body portion having annular flanged ends, respectively adapted to be connected with a water pump and the vehicle fan.

3 Claims, 3 Drawing Figures

VEHICLE FAN HUB

BACKGROUND OF THE INVENTION

1. Field of the Invention

The present invention relates to an apparatus for replacing a vehicle original equipment fan clutch drive and more particularly to a fan hub connecting the existing fan with the water pump to form a rigid drive connection for the vehicle fan.

Many automobiles, particularly those equipped with air conditioning, are provided with a fluid type clutch connected with the water pump which supports and rotates the radiator cooling fan at a speed proportional to the rate of revolution of the vehicle engine. On older model automobiles this type of fan driving clutch sometimes develops a malfunction and fails to rotate the fan or, through wear, becomes so loose on its mounting shaft that rotation of the fan endangers rupturing radiator cores or water circulating hoses thus necessitating repair or replacement of the clutch. Suitable components for repair or replacement are not ordinarily available in most service stations.

2. Description of the Prior Art

To change a vehicle clutch fan drive to positive drive the clutch and blades are discarded and replaced by spacers, bolts and a new set of fan blades to fit the water pump which, with necessary labor, is relatively expensive.

This invention provides a fan hub which will fit a plurality of different sizes of water pumps and which uses the existing fan blades.

SUMMARY OF THE INVENTION

The fan hub comprises a cylindrical body having annular flanges at each of its ends with one flange having radial slots therein for receiving existing bolts of a vehicle water pump. The other flange of the hub is provided with an annular recess nesting the central apertured portion of a vehicle fan with a perimeter portion of this flange having threaded apertures for receiving fan securing bolts. The end of the body, having the slotted flange, is provided with a coaxial socket for nesting the water pump shaft and centering the fan hub. Spacer bushings are also provided for the socket to fit small water pump shafts.

The principal object of this invention is to provide an economical hub for connecting a fan to a water pump to provide a positive drive for the fan with respect to the water pump.

DESCRIPTION OF THE PREFERRED EMBODIMENT

Figure 1:
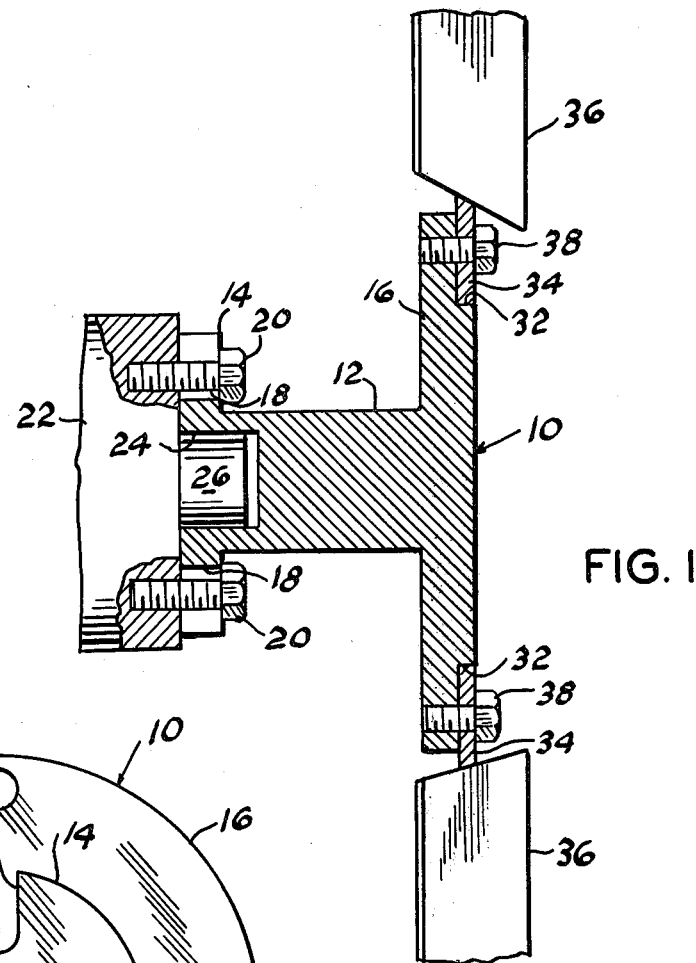
FIG. 1 is a vertical cross sectional view of the fan hub having its respective ends connected with a fragment of a vehicle water pump and a radiator fan.
Figure 2:
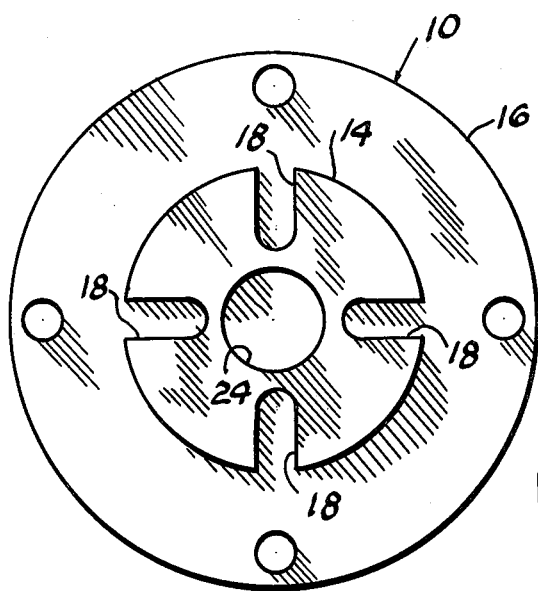
FIG. 2 is a left end elevational view of the fan hub per se, as seen in FIG. 1; and, FIG. 3 is a perspective view, to an enlarged scale, of a bushing for the water pump connected end of the hub.
Figure 3:
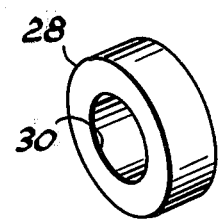

Like characters of reference designate like parts in those figures of the drawings in which they occur.

In the drawings:

The reference numeral 10 indicates the fan hub, as a whole, which is spool-like in general configuration, comprising a central cylindrical body portion 12 having annular flanges 14 and 16 at its respective ends. The flange 14 is provided with a plurality, four in the example shown, of radial slots 18 for receiving stud bolts 20 and connecting the slotted flange 14 to an existing vehicle water pump 22. The slots 18 thus permit the flange 14 to fit a plurality of different sizes of water pumps. The slotted flange end of the body 12 is provided with a coaxial socket 24 which closely surrounds the vehicle water pump shaft 26 to center the body 12 thereon. In the event the water pump shaft 26, is of smaller diameter than the socket 24, a sleeve bushing 28, or the like, is placed within the socket 24 so that the bushing bore 30 surrounds the smaller water pump shaft and similarly centers the hub body 12. The flange 16 is normally of greater diameter than the flange 14 and is provided, in its end surface opposite the slotted flange, with an annular recess 32 which nests the apertured central portion 34 of a vehicle fan 36. The flange 16 is also provided with radially spaced threaded apertures for receiving fan securing stud bolts 38.

Operation

Operation of the device seems obvious in that an existing fan clutch drive unit, not shown, is disconnected from the fan and water pump and the hub 10 installed on the water pump 22 with the fan hub 16 connected with the existing fan 36, as described hereinabove, thus providing a positive drive for the vehicle fan at the angular rate of rotation of the water pump.

Obviously the invention is susceptible to changes or alterations without defeating its practicability, therefore, I do not wish to be confined to the preferred embodiment shown in the drawings and described herein.

I claim:

1. In combination with a vehicle having a radiator fan and a water pump including a shaft, the improvement comprising:

a fan hub connecting said fan to said water pump in direct drive relation, said fan hub including a cylindrical body having an apertured annular flange at its respective ends, the apertures in one said flange defining radially spaced slots open to the periphery of said one flange, the end of said body adjacent said one flange having a central socket therein for nesting the water pump shaft.

2. The combination according to claim 1 in which the other said flange is characterized by annular recess in its peripheral end surface opposite said one flange for centering said radiator fan.

3. The combination according to claim 2 and further including:

a bushing closely received by the socket in said cylindrical body.

* * * * *